United States Patent
Kubie et al.

(10) Patent No.: US 11,900,820 B2
(45) Date of Patent: Feb. 13, 2024

(54) MAP INCLUDING DATA FOR ROUTING AERIAL VEHICLES DURING GNSS FAILURE

(71) Applicant: WING AVIATION LLC, Mountain View, CA (US)

(72) Inventors: Martin Kubie, San Francisco, CA (US); Dinuka Abeywardena, Mountain View, CA (US)

(73) Assignee: WING Aviation LLC, Mountain View, CA (US)

( * ) Notice: Subject to any disclaimer, the term of this patent is extended or adjusted under 35 U.S.C. 154(b) by 335 days.

(21) Appl. No.: 16/689,872

(22) Filed: Nov. 20, 2019

(65) Prior Publication Data

US 2021/0150917 A1    May 20, 2021

(51) Int. Cl.
*G08G 5/00*    (2006.01)
*H04W 4/029*    (2018.01)
(Continued)

(52) U.S. Cl.
CPC ......... *G08G 5/0069* (2013.01); *B64C 39/024* (2013.01); *G05D 1/0038* (2013.01);
(Continued)

(58) Field of Classification Search
CPC .. G05D 1/0038; G05D 1/0044; G05D 1/0094; G05D 1/102; B64C 39/024; B64C 2201/145; B64C 2201/123; G06T 2207/10032; G06T 2207/20016; G06T 2207/20021; G06T 2207/30232; G06T 2207/30241; G06T 7/246; G06T 7/73; G06T 2207/30168; G06T 2207/30184;
(Continued)

(56) References Cited

U.S. PATENT DOCUMENTS

| | | | |
|---|---|---|---|
| 9,665,100 B2 | 5/2017 | Shashua et al. | |
| 2015/0347872 A1* | 12/2015 | Taylor | G01C 11/06 382/224 |

(Continued)

OTHER PUBLICATIONS

Yuncheng Lu, Zhucun Xue, Gui-Song Xia & Liangpei Zhang, A survey on vision-based UAV navigation, 2018, Geo-spatial Information Science, 21:1, 21-32 (Year: 2018).*

(Continued)

*Primary Examiner* — Donald J Wallace
(74) *Attorney, Agent, or Firm* — CHRISTENSEN O'CONNOR JOHNSON KINDNESS PLLC

(57) ABSTRACT

An unmanned aerial vehicle (UAV) includes a propulsion system, a global navigation satellite system (GNSS) sensor, a camera and a controller. The controller includes logic that, in response to execution by the controller, causes the UAV to in response to detecting a loss of tracking by the GNSS sensor determine an estimated location of the UAV on a map based on a location image captured by the camera, determine a route to a destination using tracking parameters embedded in the map, wherein the map is divided into a plurality of sections and the tracking parameters indicate an ease of determining a location of the UAV using images captured by the camera with respect to each section, and control the propulsion system to cause the UAV to follow the route to the destination.

11 Claims, 11 Drawing Sheets

(51) Int. Cl.
*B64C 39/02* (2023.01)
*G05D 1/00* (2006.01)
*B64U 101/30* (2023.01)

(52) U.S. Cl.
CPC ......... *G05D 1/0044* (2013.01); *G05D 1/0094* (2013.01); *H04W 4/029* (2018.02); *B64U 2101/30* (2023.01); *B64U 2201/104* (2023.01)

(58) Field of Classification Search
CPC ........ G06T 2207/30212; G08G 5/0056; G08G 5/006; G08G 5/0086; G08G 5/0091; G08G 5/0039; G08G 5/0069; G08G 5/0013; G08G 5/0021; G08G 5/0052; H04W 4/029; G01C 21/16
See application file for complete search history.

(56) References Cited

U.S. PATENT DOCUMENTS

| | | | |
|---|---|---|---|
| 2016/0371985 A1 | 12/2016 | Kotecha | |
| 2017/0328716 A1* | 11/2017 | Ma | G06K 9/6268 |
| 2018/0157255 A1 | 6/2018 | Halverson et al. | |
| 2018/0292214 A1* | 10/2018 | Zhang | G05D 1/106 |
| 2019/0080142 A1* | 3/2019 | Abeywardena | B64D 47/08 |
| 2019/0258883 A1* | 8/2019 | Britto Mattos Lima | G05D 1/0094 |

OTHER PUBLICATIONS

Conte et al., An Integrated UAV Navigation System Based on Aerial Image Matching, 2007, IEEE, IEEEAC Paper #1276 (Year: 2007).*

Vetrella et al., "Differential GNSS and Vision-Based Tracking to Improve Navigation Performance in Cooperative Multi-UAV Systems", Article, Dec. 17, 2016, 26 pages, Sensors 2016, vol. 16(12), 2164, www.mdpi.com/journal/sensors.

Zahran, et al., "Enhanced Drone Navigation in GNSS Denied Environment Using VDM and Hall Effect Sensor", Journal, Apr. 2, 2019, 18 pages, International Journal of Geo-Information 2019, vol. 8(169), www.mdpi.com/journal/jgi.

Partial Search Report, dated Nov. 24, 2020, in International Patent Application No. PCT/US2020/049664, 10 pages.

International Search Report and Written Opinion dated Feb. 5, 2021, in International Patent Application No. PCT/US2020/049664, 15 pages.

Australian Office Action dated Mar. 10, 2023, in corresponding Australian Patent Application No. 2020388371, 3 pages.

* cited by examiner

MAP INCLUDING DATA FOR ROUTING AERIAL VEHICLES DURING GNSS FAILURE

BACKGROUND

An unmanned aerial vehicle (UAV), which may also be referred to as an autonomous vehicle, is a vehicle capable of travel without a physically-present human operator on board.

Position and orientation of the UAV should be known for a variety of reasons, for example, for maintaining the required flight path of the UAV, for avoidance of obstructions, for avoidance of the flight path of the commercial aircraft, for precise delivery of the payload, for precise coverage of certain ground area when the UAV is used in telecommunication, etc. In practice, unmanned aerial vehicles (UAVs) typically carry a global navigation satellite system (GNSS) sensor-based primary navigation system onboard to determine the UAV's location. For various reasons, however, the GNSS-based navigation system may fail, rendering the UAV inoperable. For example, the GNSS signal may be erroneous or too weak to be used by the UAV. Furthermore, the GNSS equipment of the UAV may also fail, thus making the UAV, at a minimum, incapable of fulfilling its tasks.

DESCRIPTION OF THE DRAWINGS

Many of the attendant advantages of embodiments of the present disclosure will become more readily appreciated as the same become better understood by reference to the following detailed description, when taken in conjunction with the accompanying drawings, wherein.

DETAILED DESCRIPTION

The camera-based navigation techniques described below can alleviate the single point of failure issues of UAVs which navigate primarily using a global navigation satellite system (GNSS).

The conventional UAVs typically use GNSS-based primary navigation systems to determine the location of the UAV. Some embodiments of the present disclosure are directed to generating a map and routing a UAV using the map after determining the location of the UAV when the GNSS signal is erroneous or weak by using a camera-based navigation system and navigating to a destination. Such a camera-based navigation system may be referred to as a backup or a secondary navigation system. The camera-based navigation system may have trouble maintaining an accurate estimate of the UAVs position over some areas which lack distinctive features, such as over large bodies of water, deserts, or forests. Accordingly, the camera-based navigation system may use a map with tracking parameters, indicating an ease of determining a location of the UAV using images captured by the camera, in order to plan and follow a route to a destination. The map including the tracking parameters may be generated by separating the mapped area into sections and assigning a tracking parameter to each section based on features in the mapped area.

Figure 1A:
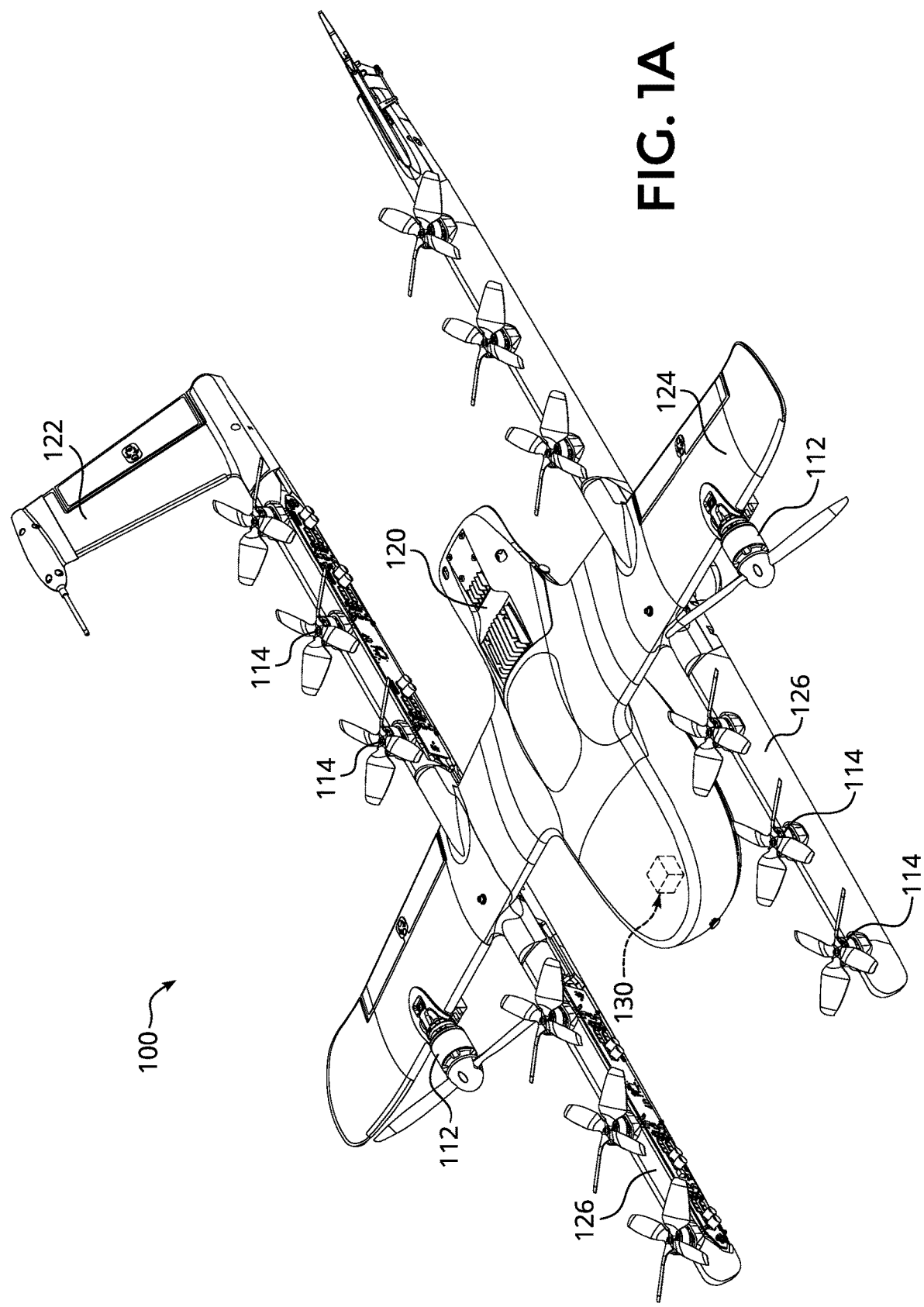
FIG. 1A is a top isometric view of a UAV in accordance with an embodiment of the present technology.

FIG. 1A is a top isometric view of a UAV 100 in accordance with an embodiment of the present technology. The UAV 100 includes a wing 124, booms 126, and a fuselage 120. In some embodiments, the wing 124 carries horizontal propulsion units 112, and the booms 126 carry vertical propulsion units 114. In some embodiments, the booms 126 terminate in rudders 122 for improved yaw control of the UAV 100.

In operation, power for the propulsion units 112, 114 may be provided from a battery compartment of the fuselage 120. In some embodiments, the fuselage 120 also includes an avionics compartment and a delivery unit for handling the payload. The fuselage 120 may carry control electronics 130.

Figure 1B:
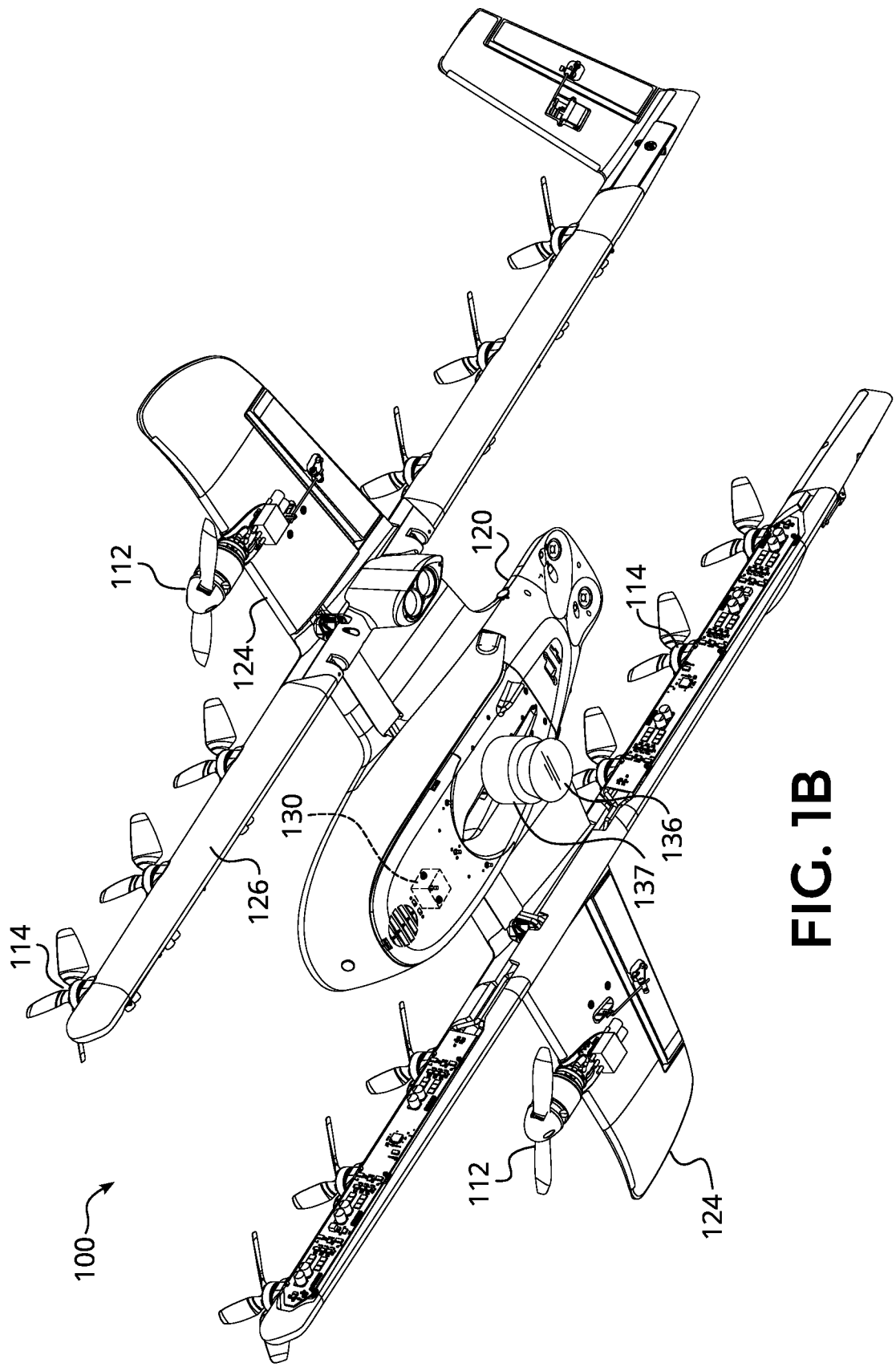
FIG. 1B is a bottom isometric view of a UAV in accordance with an embodiment of the present technology.

FIG. 1B is a bottom isometric view of the UAV 100 in accordance with an embodiment of the present technology. In some embodiments, the UAV 100 carries a camera 136 that is directed toward the ground. The camera 136 may be a digital camera that operates within the visible spectrum of light. In other embodiments, the camera 136 may operate within the infrared spectrum when, for example, operating during the night or within the ultraviolet spectrum when, for example, operating in cloudy weather. In some embodiments, the UAV 100 may include multiple cameras 136 configured to operate within different spectra.

In some embodiments, the camera 136 is carried by a pivot mechanism 137. In operation, the pivot mechanism 137 may adjust the angle of the camera 136 based on the input from control electronics 130. In response to the input from the control electronics 130, the pivot mechanism 137 may orient the camera 136 vertically to the ground to provide common reference angle for the images acquired by the camera 136. In other embodiments, the pivot mechanism 137 may orient the camera 136 at other angles.

Figure 1C:
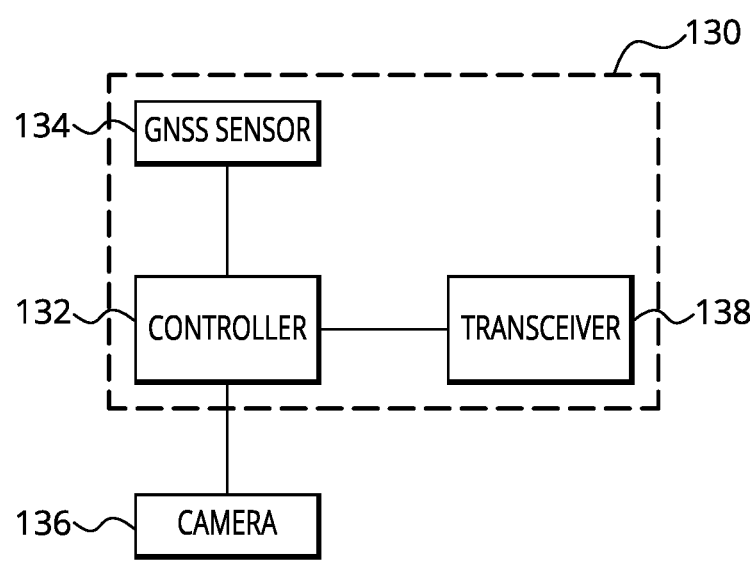
FIG. 1C is a schematic view of the control electronics of the UAV in accordance with an embodiment of the present technology.

FIG. 1C is a schematic view of the control electronics of the UAV 100 in accordance with an embodiment of the present technology. The control electronics 130 may include a controller 132, a GNSS sensor 134, and transceiver 138. The controller 132 may communicate with the camera 136 and control UAV 100. The GNSS sensor 134 may receive a global navigation satellite system signal from global navigation satellites in order to determine a location of the UAV 100. In some embodiments, the GNSS sensor 134 may communicate with the controller 132 and the controller 132 may determine the location of the UAV 100. The controller 132 may be a computer, CPU, processor, or other control circuitry. Further, the controller 132 may include a memory including instructions, code, or logic, which when executed cause the controller 132 to control the UAV 100. The transceiver 138 may receive and send signals to communicate via direct communication or indirect communication (such as via cell phone towers or other telecommunication networks).

Figure 2:
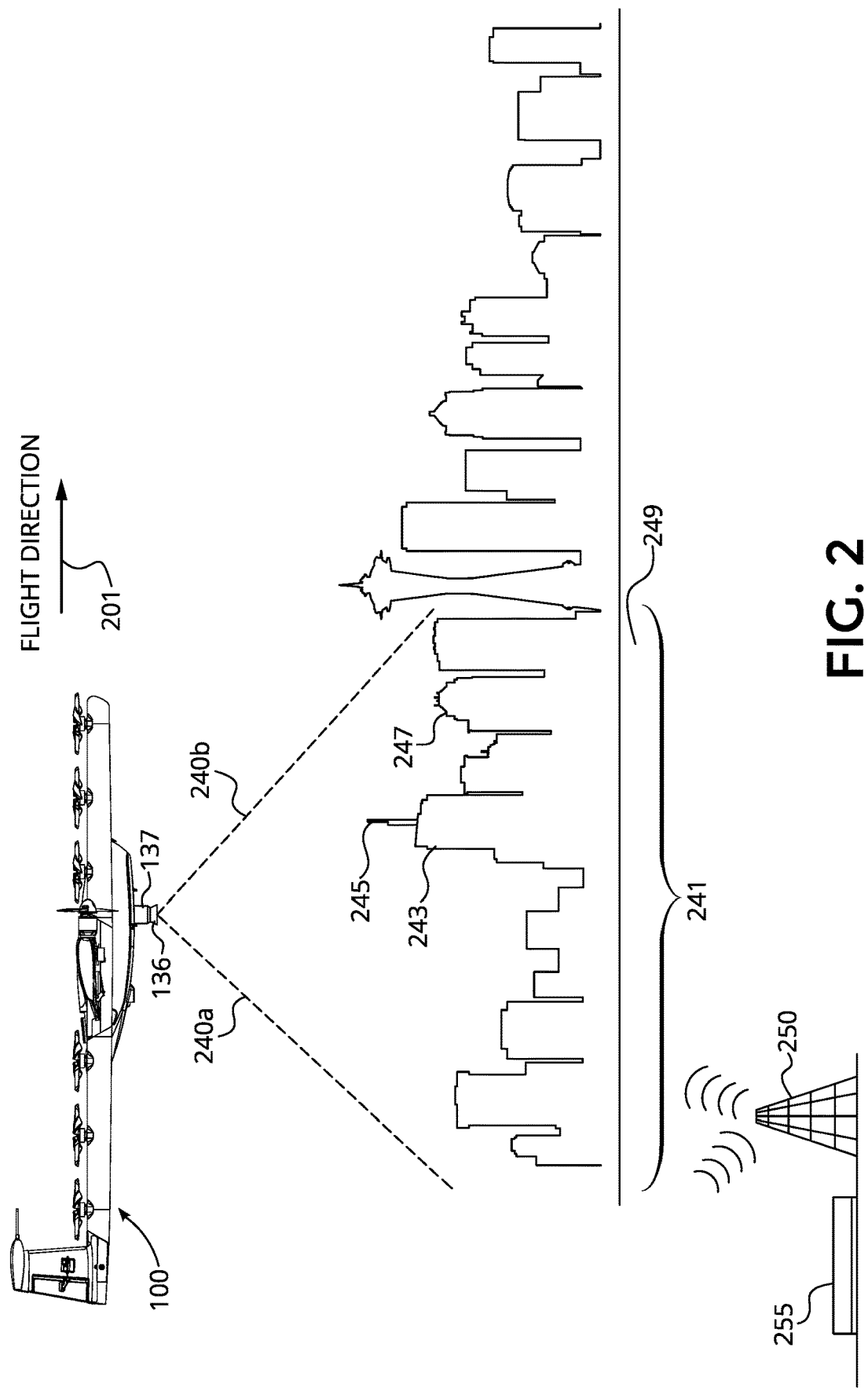
FIG. 2 is a schematic view of the UAV in operation in accordance with an embodiment of the present technology.

FIG. 2 is a schematic view of the UAV 100 in operation in accordance with an embodiment of the present technology. In some embodiments, the UAV 100 acquires images by the camera 136 while flying in a direction 201 (also referred to as flight direction or flight path) at a height of about 30-150 m above the ground. During the flight, an image of the ground area 241 may be acquired using a 640×480, 1280×800, or another pixel resolution of the camera 136. The illustrated sample acquired image includes characteristic points of the objects 245 (a spire), 243 (outline of a building), 247 (roof of a building), 249 (body of water) etc. In some embodiments, the UAV 100 carries multiple cameras. In many embodiments, the X, Y, Z coordinates of the characteristic points objects 245, 243, 247, 249 are known, and may be included as auxiliary data in the terrestrial maps.

As the UAV 100 flies in a direction 201, additional images may be acquired and sent to a network transceiver 250 (e.g., a cell phone tower). The network transceiver 250 may forward the images to a base station 255. In some embodiments, the base station 255 includes computers and/or servers capable of processing the images acquired by the camera 136 or other information transmitted by the transceiver 138.

Figure 3:
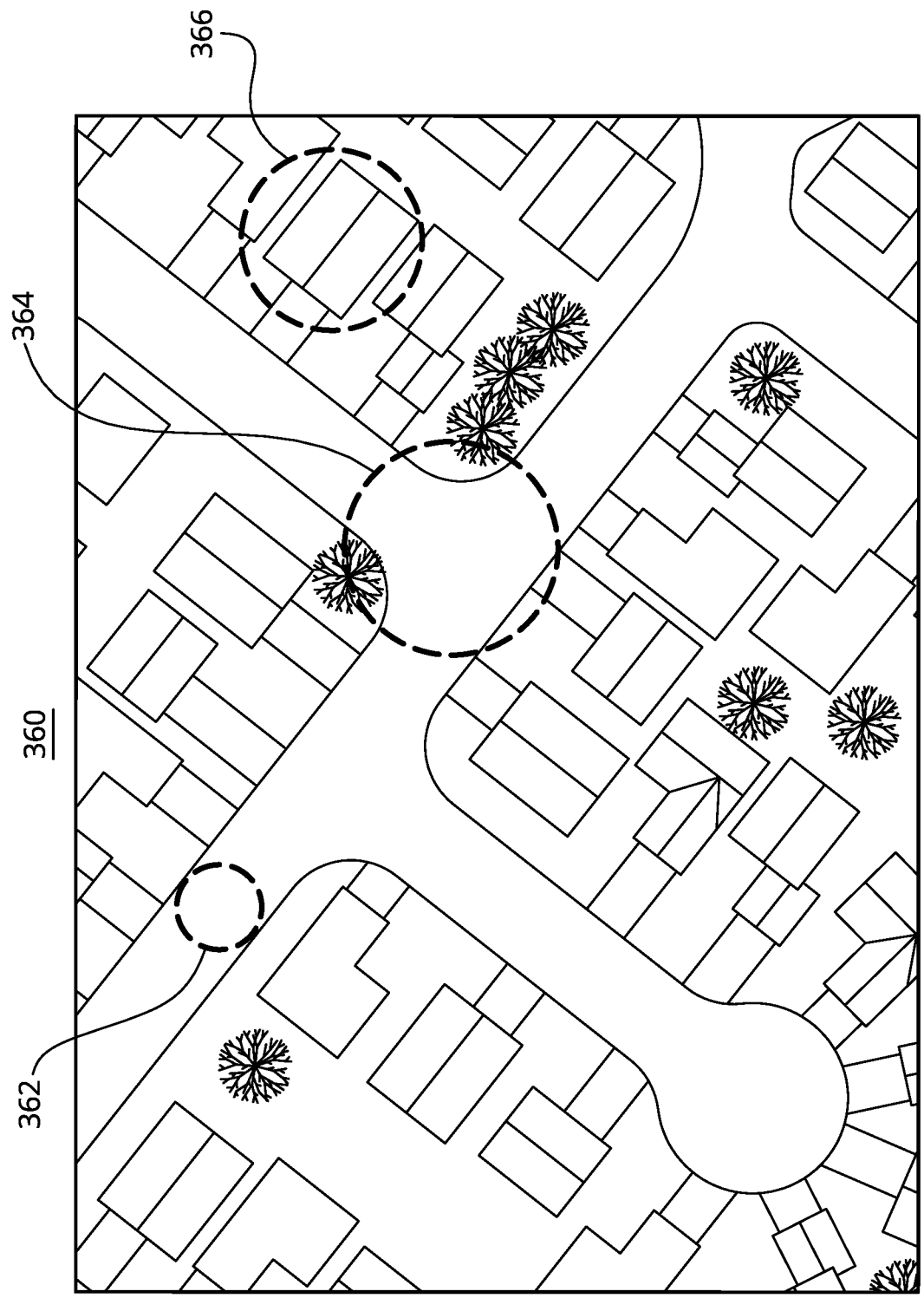
FIG. 3 is an image taken by the UAV camera in accordance with an embodiment of the present technology.

FIG. 3 is an example image 360 taken by the camera 136 in accordance with an embodiment of the present technology. The controller 132 may process the image 360 and identifying features such as buildings 366, intersections 364 and roads 362. These features are merely examples, any number of other features may also be identified such as bodies of water, fields, forests, landmarks, statues, and other permanent features.

Figure 4A:
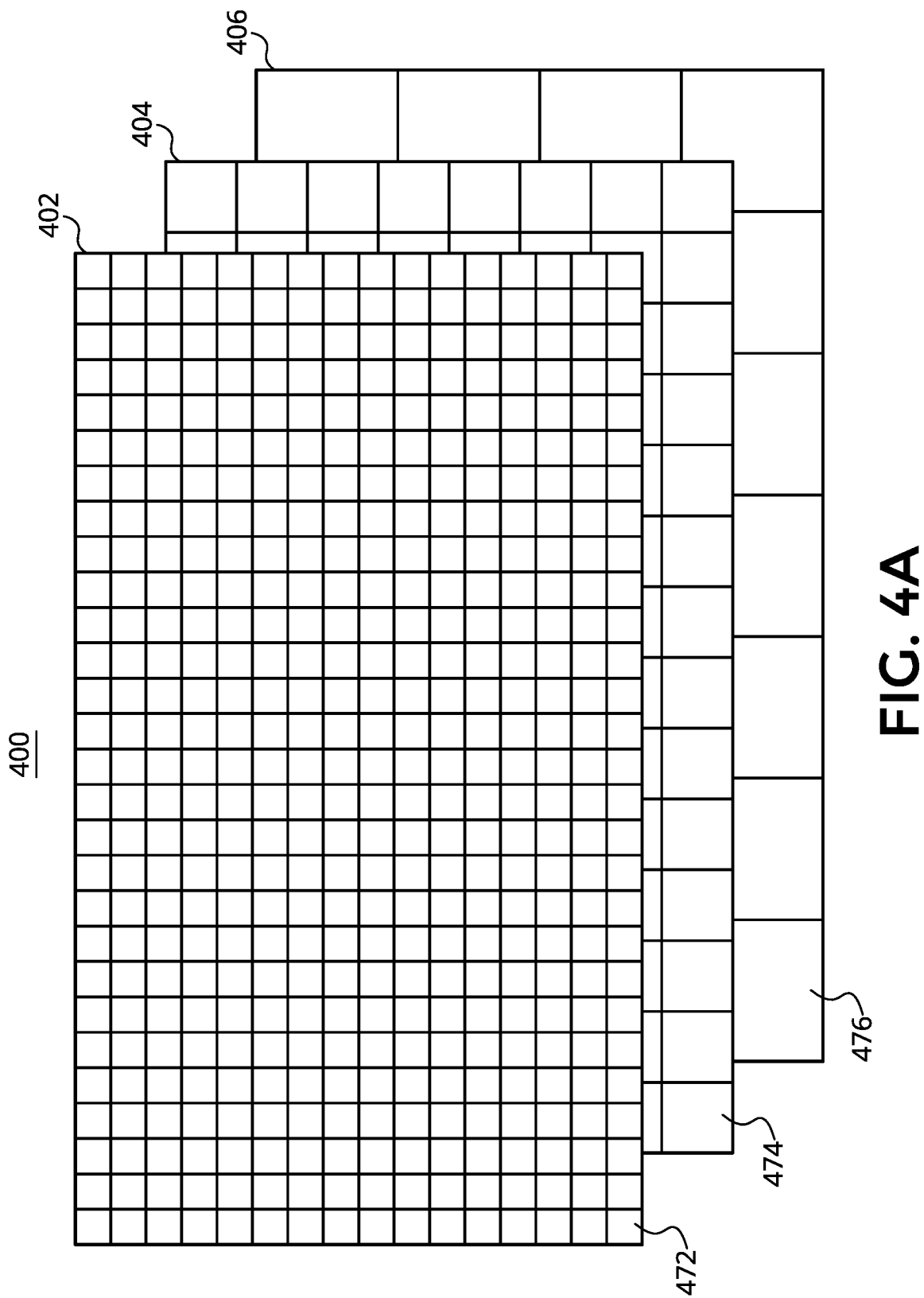
FIG. 4A shows a schematic of a three-dimensional map accordance with an embodiment of the present technology.

FIG. 4A shows a schematic of a three-dimensional map 400 in accordance with an embodiment of the present technology. The three-dimensional map 400 includes several two-dimensional layers 402, 404, 406. The individual two-dimensional layers 402, 404, 406 may be divided into sections 472, 474, 476, respectively. Each two-dimensional layer 402, 404, 406 may correspond to the UAV 100 being at a different height above the ground. Each section 472, 474, 476 may be associated with a location and may have a tracking parameter embedded in the three-dimensional map 400 and assigned to the section 472, 474, 476. The tracking parameter may be a number (for example a number between 0-10) or a ranking (for example, poor, average, good, great). The tracking parameter may indicate an ease of tracking the location of the UAV 100 using images captured by the camera 136 while flying over an area associated with the section 472, 474, 476 of the map 400. Restated, the two-dimensional layers 402, 404, 406 together form the three-dimensional map 400.

The three-dimensional map 400 may include three layers: a first two-dimensional layer 402 for under 50 meters of height; a second two-dimensional layer 404 for 50-100 meters of height; and a third two-dimensional layer 406 for 100+ meters of height. The first, second, and third two-dimensional layers 402, 404, 406 are divide into first, second and third sections 472, 474, 476 respectively. Each of the first, second and third sections 472, 474, 476 respectively may form a grid in the first, second, and third two-dimensional layers 402, 404, 406. The first sections 472 may be about 10 m by 10 m. The second sections 474 may be about 20 m by 20 m. The third sections 476 may be about 40 m by 40 m. This is only one example, the three-dimensional map 400 may be divided into any number of two-dimensional layers and the layers may correspond to any heights. The sections 472, 474, 476 of the two-dimensional layers 402, 404, 406 may also be any size. In some applications, knowing the exact location of the UAV 100 at lower heights may be more important. Accordingly, in some embodiments the first sections 472 may be 1 m by 1 m.

In some embodiments several three-dimensional maps 400 may be used together to form a four-dimensional map. Each of the different three-dimensional maps 400 forming the four-dimensional map may include images and tracking parameters for different times (such as different times of year and different times of day).

Figure 4B:
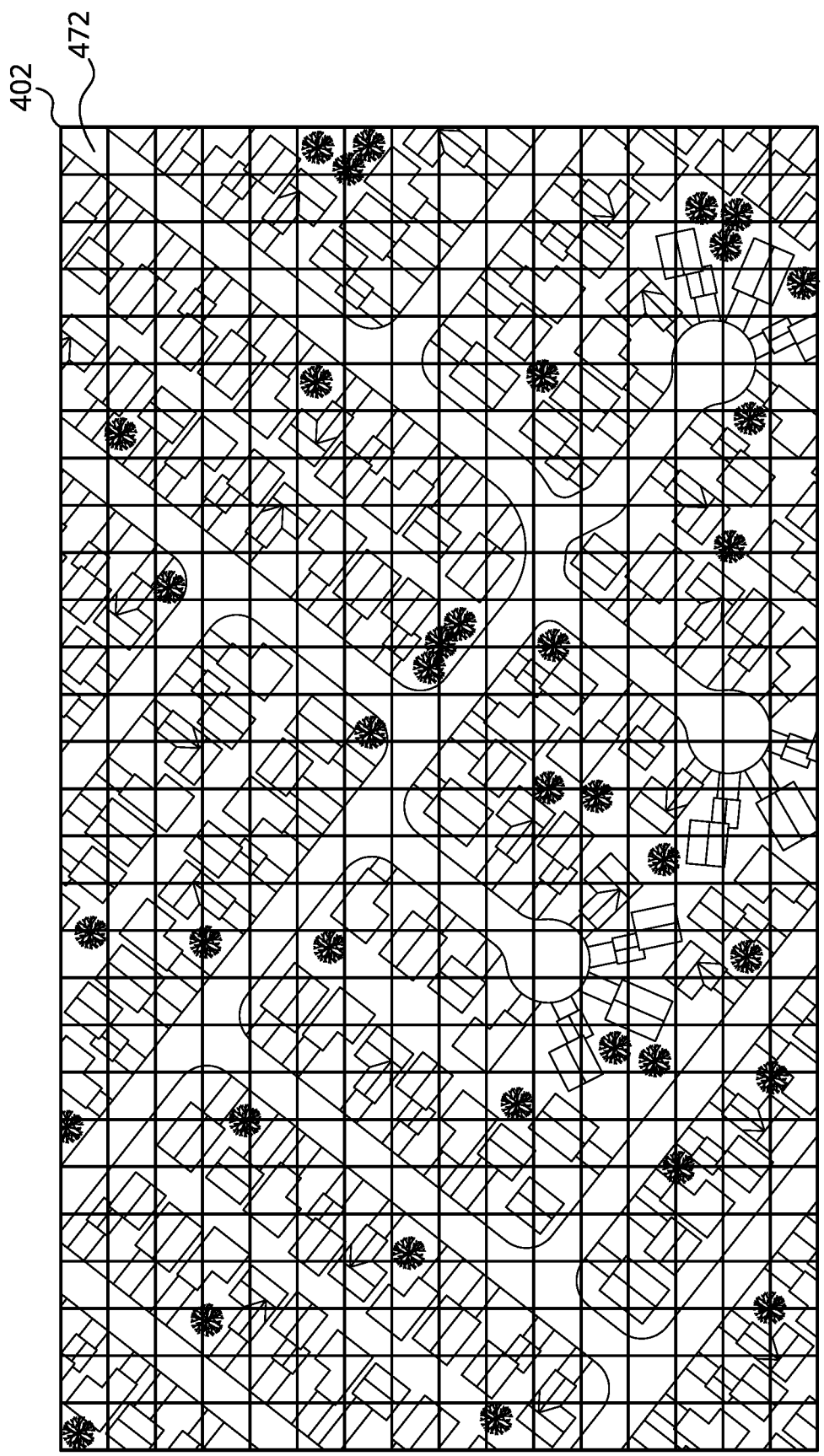
FIGS. 4B-D show two-dimensional layers of the three-dimensional map in accordance with an embodiment of the present technology.
Figure 4C:
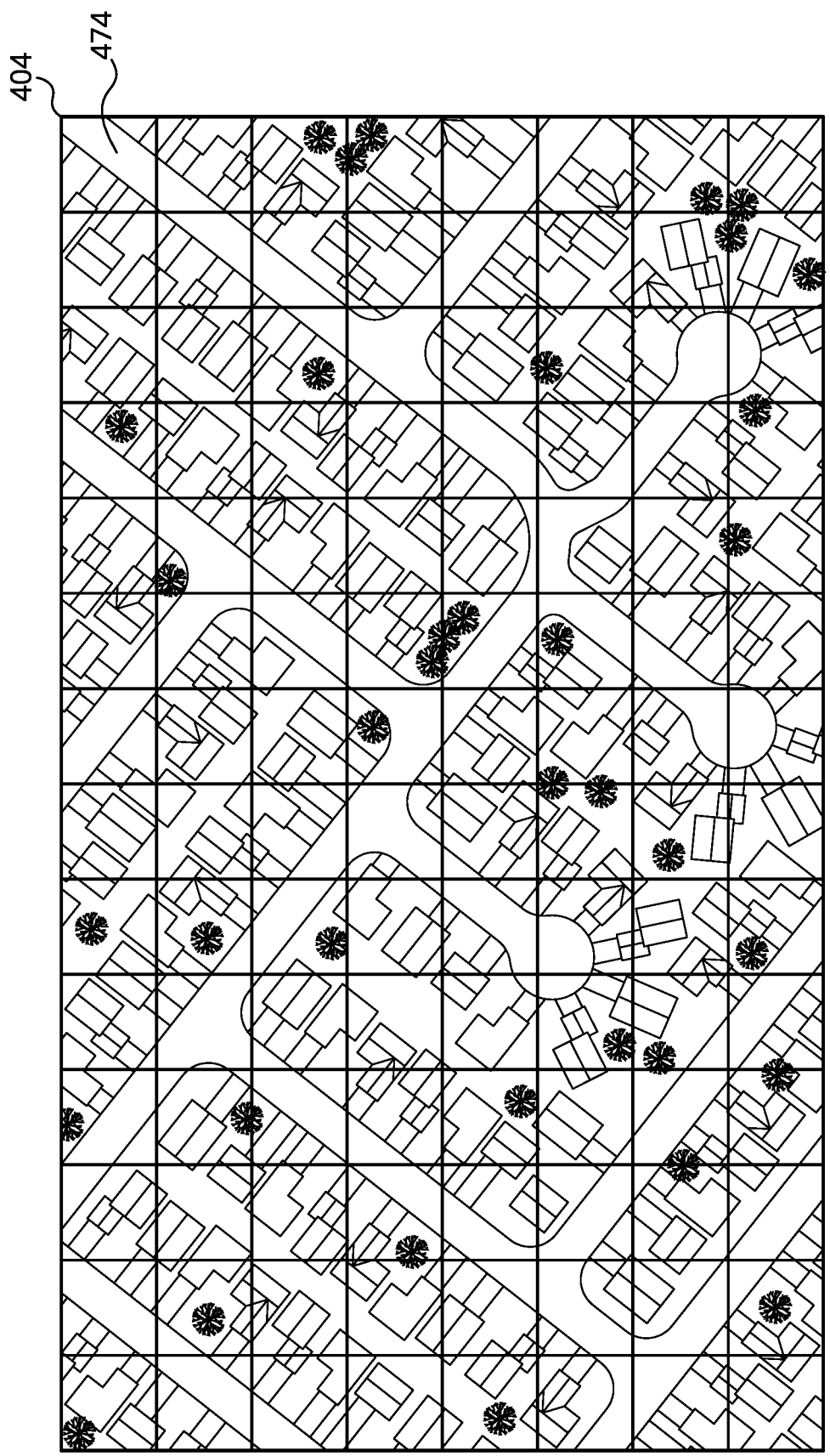
Figure 4D:
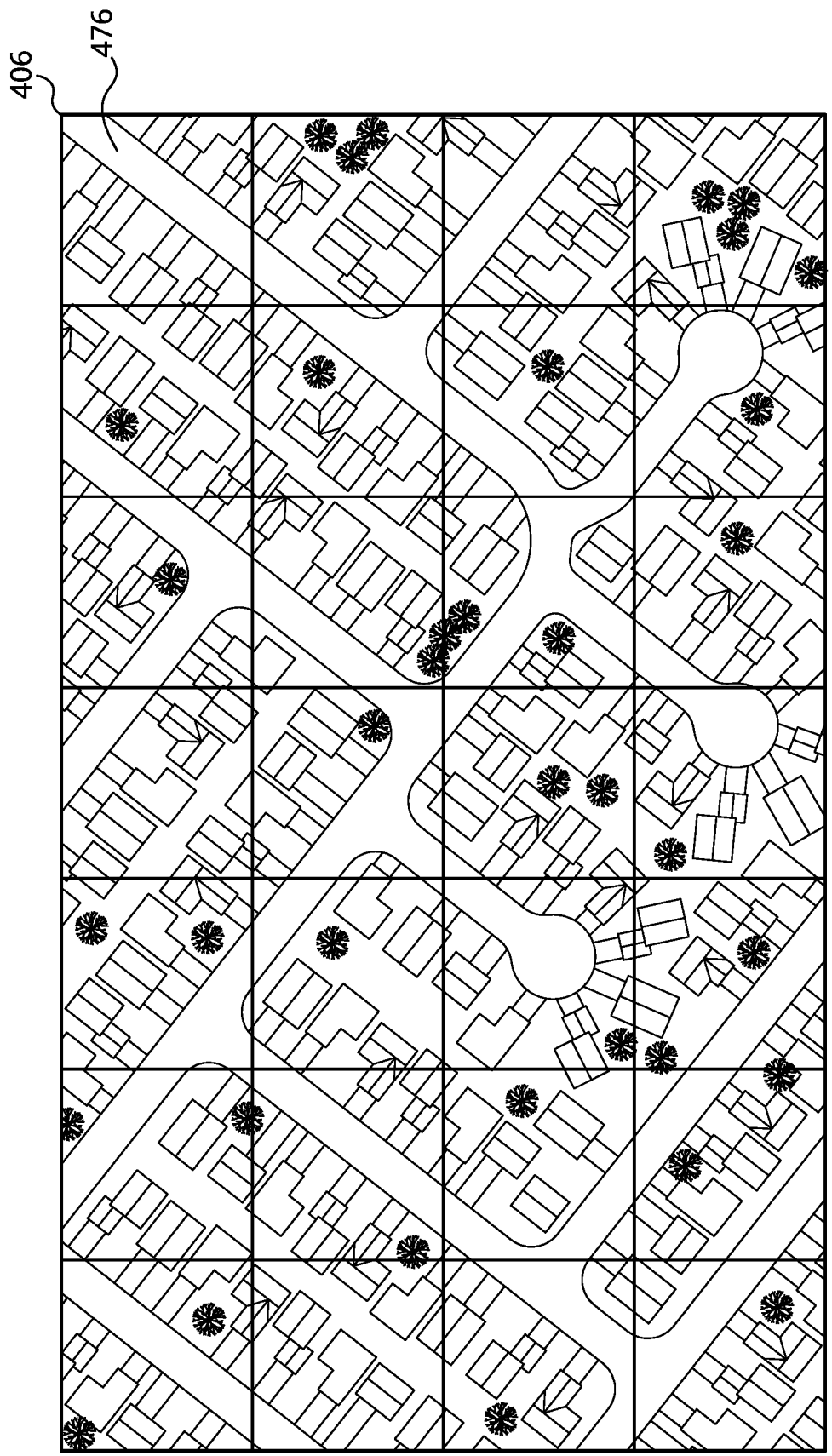

FIGS. 4B-D show two-dimensional layers 402, 404, 406 of the three-dimensional map 400 in accordance with an embodiment of the present technology. As shown, each of the two-dimensional layers 402, 404, 406 is associated with same area of the world. However, because the ease of tracking the location of the UAV 100 may differ depending on the height of the UAV 100, a different tracking parameter may be assigned to sections 472, 474, 476 of the two-dimensional layers 402, 404, 406 associated with the same area of the world. Further, because the features on the ground will appear smaller as the UAV 100 gains height, the size of the sections 472, 474, 476 of the two-dimensional layers 402, 404, 406 are different and are associated with the height of the UAV 100 for that two-dimensional layer 402, 404, 406.

The mapped area in the two-dimensional layers 402, 404, 406 as shown only include a few hundred meters of area for demonstration purposes. In practice, the two-dimensional layers 402, 404, 406 may cover entire regions and be much larger that the two-dimensional layers 402, 404, 406 depicted.

Figure 5:
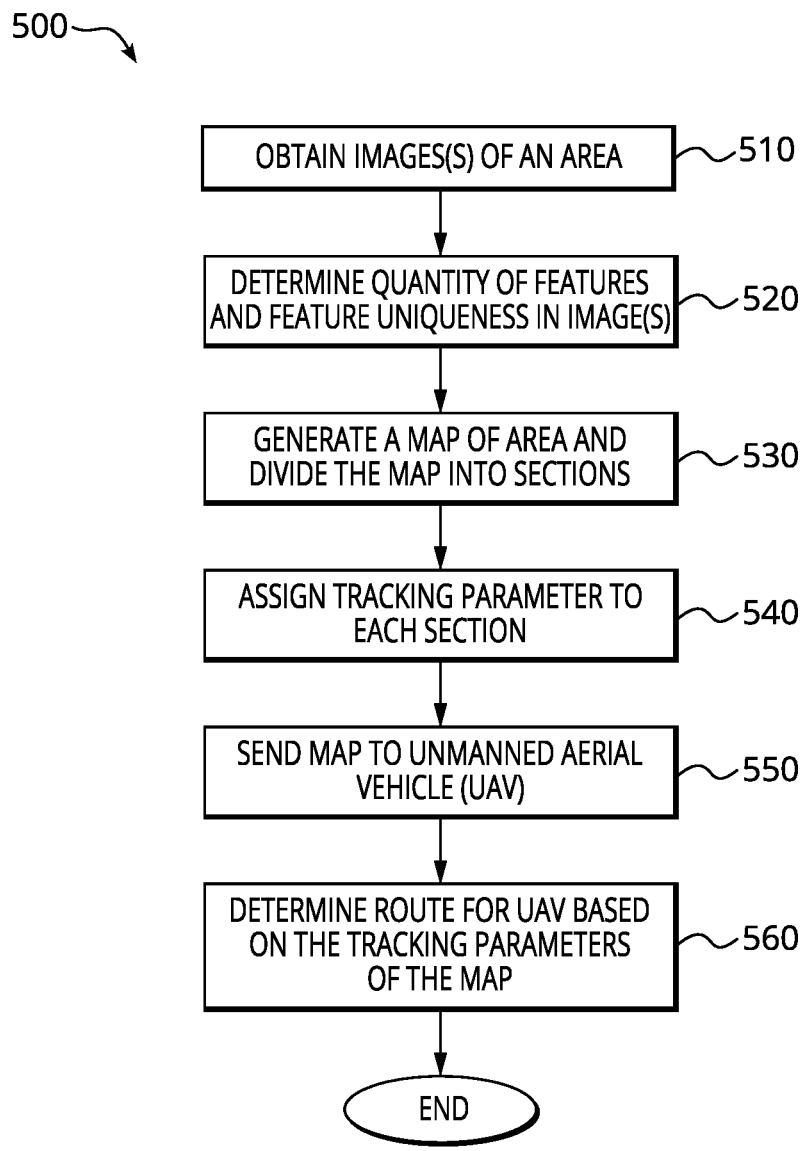
FIG. 5 is a flow diagram of a method generating and using a three-dimensional map in accordance with an embodiment of the present technology.

FIG. 5 is a flow diagram 500 of a method of generating and using a three-dimensional map 400 in accordance with an embodiment of the present technology. The method may be performed by the base station 255 or another computing system. The method starts at block 510, where the base station 255 obtains one or more images of an area to be mapped. The images may be satellite images, aerial images, or other images taken from above the area. The images also may include street level images. For some areas, such as urban areas with tall buildings, the images may include images taken facing the sides of buildings or upwards.

At block 520, the base station 255 may determine a quantity of features included in the images, and for each feature a uniqueness of the feature. The uniqueness of the feature relates to how easily the feature can be uniquely identified. For example, the uniqueness of a building with uncommon architecture is much greater than the uniqueness of a residential house with a standard floor plan. As another example, an intersection of three roads is more unique than an intersection of two roads. Temporary features of the images such as pedestrian and vehicles may be ignored as they are unlikely to be in the same positions when the map is used by a UAV 100 to navigate. In some embodiments, combinations of features may also be considered as contributing to the uniqueness. For example, two buildings with relatively common individual architecture may be unique as a pair by virtue of their relative positions or orientations to each other. The tracking parameters may be derived from image quality metrics like image contrast in addition to the visible features.

At block 530, the base station 255 may generate a map of the area and divide the map into two-dimensional layers 402, 404, 406 and sections 472, 474, 476. The map layers 402, 404, 406 are two-dimensional in that they represent a UAV 100 flying in a two-dimensional plane (if the ground is flat, the two-dimensional layers 402, 404, 406 may contour with the changing elevation of the ground), however each two-dimensional layer 402, 404, 406 may include more than a flat image. In some embodiments, as depicted in FIGS. 4B-D the two-dimensional layers 402, 404, 406 may be a satellite image or other overhead image of the ground or a road map. In other embodiments, the two-dimensional layers 402, 404, 406 may include images taken in many or all directions from some or all the sections 472, 474, 476 of the map 400. This may especially be the case for two-dimensional layers 402, 404, 406 associated with lower heights as the view of features may change significantly depending on the angle at which the features are viewed. When a four-dimensional map is used, each three-dimensional map may include two-dimensional layers 402, 404, 406 with images taken at different times of the day or of the year, since many areas may appear differently depending on the time of day or the time of year. For example, the amount of leaves on trees or the amount of water in lakes or reservoirs may change significantly during the year. Also, some features, such as street lights, may be more useful to navigate at night, while other features, such as natural landmarks, may not be visible at night.

As described above the sections 472, 474, 476 related to lower height two-dimensional layers 402, 404, 406 may be smaller than sections 472, 474, 476 related to higher height two-dimensional layers 402, 404, 406. Accordingly, the lower layers may include several times more images than the upper layers.

At block 540, the base station 255 may assign a tracking parameter to each section 472, 474, 476 based on the quantity of features and feature uniqueness of features within the view of the UAV 100 at the location and height associated with the section 472, 474, 476. The tracking parameter may be a numerical value or other value. The tracking parameter may be higher if there are a large number of features which can be identified or if there are particular features which are very unique and easy to identify. The tracking parameter may be low where there are very few features, or where it is hard to determine an exact location based on the visible features because the feature uniqueness is low.

The tracking parameters may be updated or refined continuously based on data recorded from the UAV 100 as is flies over an area. The base station 255 may receive information from the UAV 100 and compare the GNSS location with the visually derived location to refine the tracking parameter for a given location. The controller 132 of the UAV 100 may also refine the tracking parameter with or without communicating with the base station 255.

At block 550, the base station 255 may transmit the three-dimensional map 400 to the UAV 100. The three-dimensional map 400 may be transmitted using a network transceiver 250 or by any other means of transmitting information. The three-dimensional map 400 may be transmitted while the UAV 100 is on the ground or in the air. The UAV 100 may also be transmitting images to the base station 255 while traveling, which the base station 255 may use to update the three-dimensional map 400.

At block 560, the UAV 100 may use the three-dimensional map 400 to determine a route for the UAV 100 based on the tracking parameters embedded in the three-dimensional map 400. Alternatively, the UAV 100 may communicate with the base station 255 and the base station may use the use the three-dimensional map 400 to determine a route for the UAV 100 based on the tracking parameters of the map. The route determined based on the tracking parameters may be planned in order to avoid areas of the map in which the tracking parameter is low.

Figure 6:
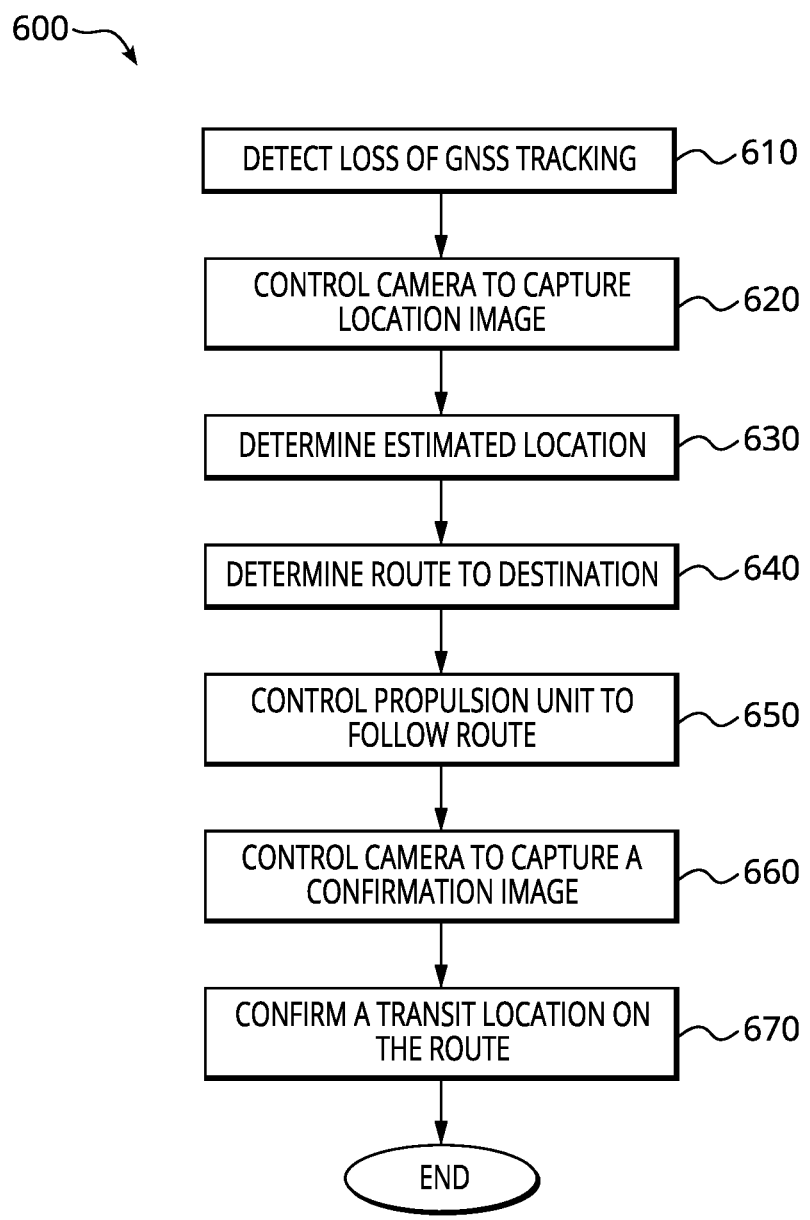
FIG. 6 is a flow diagram of a method for UAV navigation in accordance with an embodiment of the present technology.

FIG. 6 is a flow diagram 600 of a method for UAV 100 navigation in accordance with an embodiment of the present technology. In some embodiments, the method may include additional steps or may be practiced without all steps illustrated in the flow chart. Furthermore, in some embodiments, the order of the steps listed may be changed.

The method starts at block 610, where the control electronics 130 detect a loss of GNSS tracking. This may occur when the GNSS sensor 134 detects a loss of GNSS signal, when the controller 132 detects a GNSS sensor 134 malfunction, or some other malfunction of GNSS tracking. In response to this the controller 132 may switch over to camera-based navigation.

At block 620, the controller 132 may control the camera 136 to capture at least one location image, such as image 360. The location images may be taken in any direction. However, normally at least one location image will be taken of the area directly below the UAV 100. In may circumstances (and depending on local regulations), the UAV 100 will be flying at between 30 m and 150 m above the ground. In this range the camera 136 can capture an image of a few blocks of urban or suburban area (as shown in image 360). In many circumstances, the amount of information which can be gleaned from a location image taken at these heights will be sufficient to estimate the location of the UAV 100.

At block 630, the controller 132 may determine an estimated location of the UAV 100. The controller 132 may analyze the location image for features (such as roads, intersections, buildings, fields, bodies of water, forests, etc.). The controller 132 may then compare these features to features found in a map 400 stored in the control electronics 130. The controller 132 may also use a current destination, flight route, and the last tracked GNSS location when determining an estimated location. The estimating the location of the UAV 100 may include extracting features of interest from the location image, matching the features of interest to features on the map and estimating a location of the UAV 100 based on the matched features of interest. Building 366, intersection 364 and road 362 may be examples of features of interest.

In some areas (such as in rural areas, heavily forested areas, etc.) it may be more difficult for the UAV 100 to determine an estimated location based off a location image taken at lower heights. Accordingly, the controller 132 may control the propulsion units (including vertical propulsion units 114 and horizontal propulsion units 112) to cause the UAV 100 to ascend to a greater height or move to another location where a location image can be taken of a broader or more distinctive area. A change in height may not be necessary. However, if an estimated location cannot be determined at the current location of the UAV, the controller 132 may control the propulsion units 114, 112 to the UAV 100 to change the height of the UAV or move the UAV to another location in order to capture a new location image. The controller 132 may also determine several possible estimated locations based on the available information.

At block 640, the controller 132 may determine a route to a destination. The destination may be a destination to which the UAV 100 was heading before GNSS tracking was lost or may be a new destination (such as the place the UAV 100 departed from, a routing point, or other destination). The destination may be determined based on the estimated location of the UAV 100.

The route may be determined using the three-dimensional map 400 (or four-dimensional map). Specifically, the route may be determined using the tracking parameters assigned to different sections 472, 474, 476 of the two-dimensional layers 402, 404, 406 of the three-dimensional map 400. When a four-dimensional map is used, a three-dimensional map (included in the four-dimensional map) may be selected based on the time, date, weather, or other factors. The route may also be determined using other factors including: the length of the route to the destination, the amount of charge (or fuel) the UAV 100 has remaining, the time of day, local regulations, etc. In some embodiments the route may follow roads to the destination.

It is important for the UAV 100 to be able to track its location as it follows the route. For example, there may be serious consequences if the UAV 100 travels over a military base or other restricted area. The tracking parameters indicate an ease of tracking the location of the UAV 100 using the camera 136 in a particular area at a particular height. Accordingly, by planning a route using the tracking parameters the UAV 100 can be kept in areas where it is possible to track the location of the UAV 100 using the camera 136 and thus avoid the UAV 100 getting lost. Thus, the use of the tracking parameters in determining the route provides technical benefits, including ensuring that reliably determining location using the camera 136 will be available as a fallback navigation option upon failure of GNSS tracking at any point during the route.

The tracking parameters may be used in a variety of ways in planning a route. For example, the route may only include sections 472, 474, 476 of the map 400 where the tracking parameter meets a certain threshold. Restated, the route may not pass through sections 472, 474, 476, of the map 400 having a tracking parameter that does not meet a threshold value. In the example of a tracking parameter being a number between 0-10, the threshold may be 3 such that the route will not include flying through any sections 472, 474, 476 where the tracking parameter is 3 or lower. Also, the route may be determined to have fewer than a threshold number of sections 472, 474, 476, that do not meet a threshold value.

As another example, the route may be determined using an average tracking parameter along the route. For example, the shortest route to the destination with an average tracking threshold over a threshold value may be determined. As another example, the route may only include a threshold number of sections 472, 474, 476, with tracking thresholds below a threshold value. For example, the route may only include 5% of sections 472, 474, 476 with tracking parameters below 4.

In the case where the controller 132 has determined several potential estimated locations, the determined route may include a section or sections 472, 474, 476 with a very high tracking parameters in order to better determine an estimated location of the UAV 100. For example, if there are two potential estimated locations and each of them has sections 472, 474, 476 with high tracking parameters to the east, the route may start with the UAV 100 travelling east to determine a better estimated location of the UAV 100.

The tracking parameters are specific to one section 472, 474, 476 of the two-dimensional layers 402, 404, 406, and the two-dimensional layers 402, 404, 406 are specific to a certain height. Accordingly, the route may include a change in height in order to travel through sections 472, 474, 476 with higher tracking parameters. The route may also include changes in height for other reasons, such as local regulations requiring UAVs to fly in a certain range of heights.

At block 650, the controller 132 controls the propulsion units 112, 114 to cause the UAV to follow the route. At block 660, while the UAV 100 follows the route, the controller 132 controls the camera 136 to capture a confirmation image. The confirmation image, like the location image, may be captured with the camera 136 oriented in any direction. However, generally at least one confirmation image will include the area directly below the UAV 100. The confirmation image may be processed by the controller 132 in the same way as the location image. The image 360 could also be a confirmation image.

At block 670, the controller 132 uses the confirmation image to identify a transit location and confirm that the transit location is on the route. The controller 132 may use the confirmation image to track progress on the route and also to confirm that the initial estimated location is correct. If the controller 132 is not able to confirm the transit location as being on the route, the controller 132 may return to block 630 and determine a new estimated location.

Blocks 660 and 670 may be repeated constantly while the UAV 100 is airborne. Restated, the controller 132 may use the camera 136 to constantly monitor the progress of the UAV 100 along the route. The controller 132 and camera 136 may perform these functions even when the UAV 100 is traveling with GNSS tracking.

Alternatively, the operations of flow diagram 600 may be performed based on instructions from base station 255. For example, at block 610, the base station 255 may communicate with the UAV 100, to receive a signal indicating that GNSS tracking was lost. At block 620, the base station 255 may send instructions for camera 136 of the UAV 100 to capture a location image. At block 630, the UAV 100 may transmit the location image to the base station 255 and the base station 255 may determine an estimated location of the UAV 100. At block 640, the base station 255 may then determine route to a destination. At block 650, the base station 255 may send the route to the UAV 100 and also send directions for the UAV 100 to control the propulsion system to follow the route. At block 660, the base station 255 may also send instructions for the camera 136 to capture a confirmation image and transmit the confirmation image to the base station 255. At block 670, the base station may track the progress of the UAV 100 and confirm that the transit location is on the route.

Many embodiments of the technology described above may take the form of computer-executable or controller-executable instructions, including routines stored on non-transitory computer readable media and executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. In many embodiments, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

What is claimed is:

1. An unmanned aerial vehicle (UAV) comprising:
a propulsion system;
a global navigation satellite system (GNSS) sensor;
a camera; and
a controller including logic that, in response to execution by the controller, causes the UAV to:
in response to detecting a loss of tracking by the GNSS sensor:
determine an estimated location of the UAV on a map based on a location image captured by the camera;
determine a route to a destination using tracking parameters embedded in the map, wherein the map is divided into a plurality of sections and the tracking parameters indicate an ease of determining a location of the UAV using images captured by the camera with respect to each of the sections, wherein determining the route includes planning the route to avoid passing over one of the sections of the map having a corresponding tracking parameter that does not meet a threshold value of ease for determining the location of the UAV using the images; and
control the propulsion system to cause the UAV to follow the route to the destination.

2. The UAV of claim 1, wherein determining the estimated location of the UAV on the map based on the image captured by the camera includes:
determining the estimated location of the UAV on the map based on the image captured by the camera and a last tracked location of the UAV from the GNSS sensor.

3. The UAV of claim 1, wherein the logic further causes the UAV to, in response to detecting the loss of tracking by the GNSS sensor, control the propulsion system to cause the UAV to ascend before the location image is captured by the camera.

4. The UAV of claim 1, wherein the tracking parameters are numerical values.

5. The UAV of claim 4, wherein the controller further includes logic to determine the route based on an average tracking parameter of sections of the map in the route.

6. The UAV of claim 4, wherein the controller further includes logic to determine the route such that the UAV travels through fewer than a threshold number of areas related to sections of the map with a tracking parameter that does not meet a threshold value when following the route.

7. The UAV of claim 1, wherein the map is a three-dimensional map, wherein the three-dimensional map includes a plurality of two-dimensional layers, and wherein different two-dimensional layers of the three-dimensional map correspond to different heights of the UAV.

8. The UAV of claim 7, wherein determining the route includes determining a route that includes a change in height of the UAV.

9. The UAV of claim 1, wherein determining the estimated location of the UAV on the map based on the location image captured by the camera includes:
extracting features of interest from the location image;
matching the features of interest to features on the map; and
estimating a location of the UAV based on the matched features of interest.

10. An unmanned aerial vehicle (UAV) comprising:
a propulsion system;
a global navigation satellite system (GNSS) sensor;
a camera; and
a controller including logic that, in response to execution by the controller, causes the UAV to:
in response to detecting a loss of tracking by the GNSS sensor:
determine an estimated location of the UAV on a map based on a location image captured by the camera;
determine a route to a destination using tracking parameters embedded in the map, wherein the map is divided into a plurality of sections and the tracking parameters indicate an ease of determining a location of the UAV using images captured by the camera with respect to each of the sections, wherein the route is determined such that the UAV travels through fewer than a threshold number of the sections of the map having a corresponding tracking parameter that does not meet a threshold value when following the route; and
control the propulsion system to cause the UAV to follow the route to the destination.

11. An unmanned aerial vehicle (UAV) comprising:
a propulsion system;
a global navigation satellite system (GNSS) sensor;
a camera; and
a controller including logic that, in response to execution by the controller, causes the UAV to:
in response to detecting a loss of tracking by the GNSS sensor:
determine an estimated location of the UAV on a map based on a location image captured by the camera;
determine a route to a destination using tracking parameters embedded in the map, wherein the map is divided into a plurality of sections and the tracking parameters indicate an ease of determining a location of the UAV using images captured by the camera with respect to each of the sections, wherein determining the route includes planning the route with a preference for passing the route over first sections of the map deemed easier, as indicated by the tracking parameters, to determine the location of the UAV using the images while avoiding second sections of the map deemed more difficult, as indicated by the tracking parameters, to determine the location of the UAV using the images; and
control the propulsion system to cause the UAV to follow the route to the destination.

* * * * *